US012756500B2

(12) United States Patent
Lee et al.

(10) Patent No.: US 12,756,500 B2
(45) Date of Patent: Oct. 6, 2026

(54) METHOD, DEVICE, AND SYSTEM FOR REDUCING RECEIVING-END RLC PROCESSING LOAD THROUGH HIGHLY RELIABLE HARQ FEEDBACK-BASED RLC RETRANSMISSION

(71) Applicant: Samsung Electronics Co., Ltd., Gyeonggi-do (KR)

(72) Inventors: Hyunjoong Lee, Gyeonggi-do (KR); Jiyoung Cha, Gyeonggi-do (KR); Jungsoo Jung, Gyeonggi-do (KR); Byounghoon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 507 days.

(21) Appl. No.: 18/261,023

(22) PCT Filed: Jan. 14, 2022

(86) PCT No.: PCT/KR2022/000703
§ 371 (c)(1),
(2) Date: Jul. 11, 2023

(87) PCT Pub. No.: WO2022/154554
PCT Pub. Date: Jul. 21, 2022

(65) Prior Publication Data
US 2024/0097828 A1 Mar. 21, 2024

(30) Foreign Application Priority Data
Jan. 15, 2021 (KR) ........................ 10-2021-0006250

(51) Int. Cl.
*H04L 1/1812* (2023.01)
*H04L 1/08* (2006.01)
(Continued)

(52) U.S. Cl.
CPC .............. *H04L 1/1812* (2013.01); *H04L 1/08* (2013.01); *H04L 1/1893* (2013.01); *H04W 72/21* (2023.01)

(58) Field of Classification Search
None
See application file for complete search history.

(56) References Cited

U.S. PATENT DOCUMENTS 6,771,659 B1 8/2004 Parantainen et al.
8,537,788 B2 9/2013 Lee et al.
(Continued)

FOREIGN PATENT DOCUMENTS

CN 110138514 8/2019
EP 1 249 094 11/2006
(Continued)

OTHER PUBLICATIONS

PCT/ISA/210 Search Report dated Apr. 26, 2022, issued on PCT/KR2022/000703, pp. 5.
(Continued)

*Primary Examiner* — Jenkey Van
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE).

15 Claims, 12 Drawing Sheets

(51) Int. Cl.
*H04L 1/1867* (2023.01)
*H04W 72/21* (2023.01)

(56) References Cited

U.S. PATENT DOCUMENTS

| | | | |
|---|---|---|---|
| 9,455,804 B2 | 9/2016 | Kim et al. | |
| 11,395,289 B2 | 7/2022 | Yoo et al. | |
| 11,595,964 B2 | 2/2023 | Xing et al. | |
| 2008/0186944 A1* | 8/2008 | Suzuki .................. | H04L 1/1812 370/349 |
| 2010/0017671 A1 | 1/2010 | Cai et al. | |
| 2014/0098761 A1 | 4/2014 | Lee et al. | |
| 2015/0036600 A1 | 2/2015 | Hong | |
| 2016/0302105 A1* | 10/2016 | Damnjanovic ..... | H04W 28/065 |
| 2017/0264419 A1 | 9/2017 | Fakoorian et al. | |
| 2018/0310201 A1 | 10/2018 | Lee et al. | |
| 2021/0050948 A1 | 2/2021 | Gao et al. | |
| 2021/0194639 A1* | 6/2021 | Yu ......................... | H04L 1/1848 |
| 2021/0297199 A1 | 9/2021 | Miao et al. | |

FOREIGN PATENT DOCUMENTS

| | | |
|---|---|---|
| EP | 1 956 743 | 8/2008 |
| KR | 10-2010-0065980 | 6/2010 |
| KR | 10-2011-0033858 | 3/2011 |
| KR | 10-1691480 | 12/2016 |
| KR | 10-1717528 | 3/2017 |
| KR | 10-2017-0114911 | 10/2017 |
| KR | 10-2018-0064554 | 6/2018 |
| KR | 10-2020-0110774 | 9/2020 |
| WO | WO 2020/056068 | 3/2020 |

OTHER PUBLICATIONS

PCT/ISA/237 Written Opinion dated Apr. 26, 2022, issued on PCT/KR2022/000703, pp. 3.

European Search Report dated Mar. 15, 2024 issued in counterpart application No. 22739747.8-1213, 10 pages.

Korean Office Action dated Jun. 1, 2026 issued in counterpart application No. 10-2021-0006250, 10 pages.

EP Communication Report dated Mar. 18, 2026 issued in counterpart application No. 22739747.8-1206, 9 pages.

* cited by examiner

METHOD, DEVICE, AND SYSTEM FOR REDUCING RECEIVING-END RLC PROCESSING LOAD THROUGH HIGHLY RELIABLE HARQ FEEDBACK-BASED RLC RETRANSMISSION

PRIORITY

This application is a National Phase Entry of PCT International Application No. PCT/KR2022/000703, which was filed on Jan. 14, 2022, and claims priority to Korean Patent Application No. 10-2021-0006250, which was filed on Jan. 15, 2021, the entire content of each of which is incorporated herein by reference.

TECHNICAL FIELD

The disclosure relates to a method, a device, and a system for reducing a processing load of an RLC layer of a reception end via highly reliable HARQ feedback-based RLC retransmission, and more particularly, to a method, a device, and a system for reducing a processing load of an RLC layer of a reception end in a $5^{th}$ generation (5G NR)/$6^{th}$ generation (6G) mobile communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE

Technical Problem

In order to overcome an existing problem of a decrease in a yield rate due to an RLC processing load, an ARQ retransmission function of an RLC layer may be replaced with a HARQ retransmission function of an MAC layer, and thus the processing load of the RLC layer may be dramatically reduced.

Technical Solution

According to the disclosure to overcome the above-described drawback, a method performed by a base station may include an operation of transmitting feedback resource allocation information to a user equipment (UE), an operation of transmitting a transport block to the UE, an operation of receiving, based on the feedback resource allocation information, HARQ feedback information from the UE, and operation of mapping, based on the received HARQ feedback information, the transport block and a protocol data unit (PDU), and an operation of retransmitting, based on the mapping, the transport block to the UE.

According to some embodiments, the HARQ feedback information may include a redundancy bit, and the redundancy bit may occupy at least a predetermined ratio of the HARQ feedback information.

According to some embodiments, the HARQ feedback information may include a plurality of pieces of UCI, the plurality of pieces of UCI may include first UCI and second UCI, the first UCI may be related to initial feedback, and the second UCI may be related to repeated feedback.

According to some embodiments, the method may further include an operation of receiving, based on the feedback resource allocation information, repeated HARQ feedback from the UE, and an operation of determining, based on the repeated HARQ feedback, whether to perform retransmission.

According to some embodiments, the base station may further include an operation of identifying whether the base station is in an unacknowledged mode (UM), and, in case that the base station is in the UM, the repeated HARQ feedback information is not received.

According to another embodiment of the disclosure, a method performed by a user equipment (UE) may include an operation of receiving feedback resource allocation information from a base station, an operation of receiving a transport block from the base station, an operation of allocating, based on the feedback resource allocation information, a feedback resource, an operation of transmitting, to the base station, HARQ feedback information in the allocated resource, and an operation of re-receiving, based on mapping information based on the HARQ feedback information, the transport block from the base station, wherein the mapping information may be information obtained by the base station by mapping the transport block and a protocol data unit (PDU).

According to another embodiment of the disclosure, a base station may include a transceiver configured to transmit or receive at least one signal, and a controller coupled to the transceiver, and the controller may be configured to transmit feedback resource allocation information to a UE, to transmit a transport block to the UE, to receive, based on the feedback resource allocation information, HARQ feedback information from the UE, to map, based on the received HARQ feedback information, the transport block and a protocol data unit (PDU), and to retransmit, based on the mapping, the transport block to the UE.

According to another embodiment of the disclosure, a UE may include a transceiver configured to transmit or receive at least one signal, and a controller coupled to the transceiver, wherein the controller is configured to receive feedback resource allocation information from a base station, to receive a transport block from the bases station, to allocate, based on the feedback resource allocation information, a feedback resource, to transmit, to the base station, a HARQ feedback information in the allocated resource, and to re-receive, based on mapping information based on the HARQ feedback information, the transport block from the base station, wherein the mapping information is information obtained by the base station by mapping the transport block and a protocol data unit (PDU).

Advantageous Effects

An RLC processing load of a transceiving end may be reduced by replacing an ARQ retransmission function by utilizing high-reliability HARQ feedback information. In addition, an increase in a transmission yield rate may be expected by decreasing a processing load of an RLC layer.

MODE FOR INVENTION

The disclosure relates to a method, a device, and a system for reducing a processing load of a radio link control (RLC) layer of a reception end in a $5^{th}$ generation (5G NR)/$6^{th}$ generation (6G) mobile communication system. The technical fields related to the disclosure may be classified as follows.

Channel Coding

Channel coding is a process in which a transmission end transmits information bits that originally need to be transmitted together with redundant information (parity bits) so that a reception end is capable of detecting and correcting an error while information is transmitted via a channel. The purpose of channel coding is to detect and correct an error, whereby bit error rate (BER) performance may be improved.

Time/Frequency Resource Management

The 5G NR/6G mobile communication system has a purpose of providing the maximum network performance by utilizing a limited amount of resource. Generally, the performance of a network is decreased in proportion to a time spent in transmitting the same information, and is increased in proportional to a frequency resource. The management of such a resource may be performed by a base station, and information associated with a resource that a UE is to use for transmitting or receiving data is transferred via control information.

Cross-Layer Network Protocol Design

Figure 1:
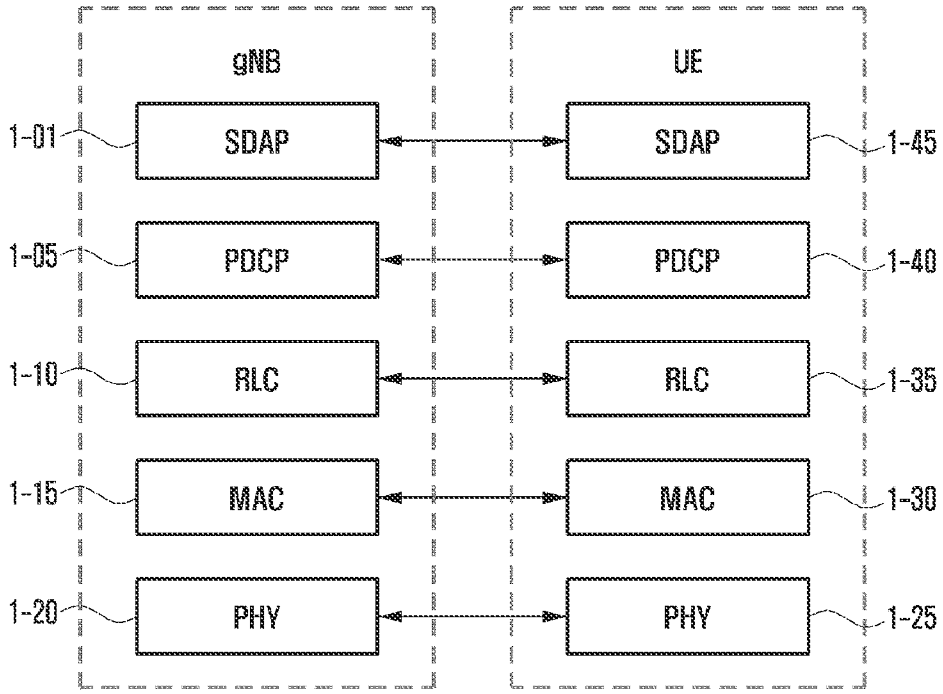
FIG. 1 is a diagram illustrating a radio protocol structure of a next generation mobile communication system to which the disclosure is applicable.

A communication protocol is a system of a mode and a rule used for exchanging a message among communication devices (a base station, a UE, or the like). A protocol stack refers to protocols collected in a layered structure, and the purpose of dividing them into layers is to enable the protocols to dividedly play roles in a significantly complex network. In this instance, a single protocol that belongs to one layer communicates with another protocol in an adjacent layer, and a network protocol design that takes into consideration of such communication between the protocols is referred to as a cross-layer protocol design. FIG. 1 is a diagram illustrating user-plane protocol stacks of a base station and a user in the 5G system.

FIG. 1 is a diagram illustrating a radio protocol structure of a next generation mobile communication system to which the disclosure is applicable. Referring to FIG. 1, a radio protocol of a next generation mobile communication system may include an SDAP 1-01 and 1-45, a PDCP 1-05 and 1-40, an RLC 1-10 and 1-35, and a MAC 1-15 and 1-30 for each of a UE and a gNB.

The main functions of the SDAP 1-01 and 1-45 may include part of the following functions.

- Transfer of user data (transfer of user plane data)
- Mapping between a QoS flow and a data bearer for an uplink and a downlink (mapping between a QoS flow and a DRB for both DL and UL)
- Marking a QoS flow ID for a DL and a UL (marking QoS flow ID in both DL and UL packets)
- Mapping a reflective QoS flow to a data bearer for uplink SDAP protocol data units (SDAP PDU) (reflective QoS flow to DRB mapping for the UL SDAP PDUs)

In association with an SDAP layer device, whether to use the header of the SDAP layer device or whether to use the function of the SDAP layer device may be configured for the UE via a radio resource control (RRC) message for each PDCP layer device, for each bearer, or for each logical channel. If the SDAP header is configured, a NAS reflective QoS configuration one-bit indicator (NAS reflective QoS) and an AS reflective QoS configuration one-bit indicator (AS reflective QoS) of the SDAP header may provide an indication so that the UE updates or reconfigures mapping information between a QoS flow and a data bearer in an uplink and a downlink. The SDAP header may include QoS flow ID information indicating QoS. The QoS information may be used as data processing priority information, scheduling information, or the like for supporting a smooth service.

The main functions of the PDCP 1-05 and 1-40 may include part of the following functions.

- Header compression and decompression: (Header compression and decompression: ROHC only)
- Transfer of user data
- Sequential transfer (in-sequence delivery of upper layer PDUs)
- Non-sequential transfer (out-of-sequence delivery of upper layer PDUs)
- Reordering (PDCP PDU reordering for reception)
- Duplicate detection (duplicate detection of lower layer SDUs)
- Retransmission (retransmission of PDCP SDUs)
- Ciphering and deciphering
- Timer-based SDU discard (timer-based SDU discard in uplink)

The reordering function of the PDCP device may refer to a function of sequentially reordering PDCP PDUs received from a lower layer according to a PDCP sequence number (SN), and may include a function of transferring sequentially reordered data to an upper layer, a function of immediately transferring data irrespective of a sequence, a function of recording lost PDCP PDUs after sequential reordering, a function of reporting the states of lost PDCP PDUs to a transmission side, and a function of requesting retransmission of lost PDCP PDUs.

The main functions of the RLC 1-01 and 1-35 may include part of the following functions.

- Transfer of data (transfer of upper layer PDUs)
- Non-sequential transfer (out-of-sequence delivery of upper layer PDUs)
- ARQ (error correction through ARQ)
- Segmentation and reassembly (segmentation and reassembly of RLC SDUs)
- Re-segmentation (re-segmentation of RLC data PDUs)
- Duplicate detection
- Error detection (protocol error detection)
- RLC SDU discard
- RLC re-establishment The non-sequential delivery function (out-of-sequence delivery) of an RLC device is a function of immediately transferring RLC SDUs, received from a lower layer, to an upper layer irrespective of a sequence. In case that a single original RLC SDU is divided into multiple RLC SDUs and the multiple RLC SDUs are received, the non-sequential delivery function may include a function of storing the divided segments in a buffer or reassembling and transmitting segments to be received later into a single intact RCL PDU, and a function of storing the RLC SN of the received RLC PDUs and recording lost RLC PDUs.

The MAC 1-15 and 1-30 may be connected to multiple RLC layer devices configured for a single UE, and the main functions of the MAC may include part of the following functions.

- Mapping (Mapping between logical channels and transport channels)
- Multiplexing and demultiplexing (multiplexing/demultiplexing of MAC SDUs)
- Scheduling information reporting
- HARQ (error correcting through HARQ)
- Priority handling between logical channels (priority handling between logical channels of one UE)
- Priority handling between UEs (priority handling between UEs by means of dynamic scheduling)
- MBMS service identification
- transport format selection
- Padding The PHY layer 1-20 and 1-25 performs channel-coding and modulating of upper layer data to produce an OFDM symbol and transmits the OFDM symbol via a wireless channel, or performs demodulating and channel-decoding of the OFDM symbol received via a wireless channel and transmits the demodulated and channel-decoded OFDM symbol to an upper layer.

Uplink Control Information Transmission Channel (PUCCH)

In addition, in case of a downlink in which a base station transmits data to a UE, the data may be transmitted via a downlink data transmission channel (PDSCH), and whether transmission of the corresponding data is successfully performed/fails may be transmitted from the UE to the base station via an uplink control information transmission channel (PUCCH). In this instance, L1/L2 control information transmitted in an uplink may include the following.

1. Hybrid-ARQ(HARQ) ACK/NACK feedback for a transport block that a UE receives
2. Channel-state information (CSI) for a downlink channel state
3. Scheduling request (SR) that requests an uplink resource needed when a UE transmits data in an uplink In addition, uplink control information may be transmitted via a PUCCH by using various formats. A PUCCH format may differ depending on the amount of information (number of bits) transmitted, and the number of OFDM symbols (time resources) used. Although it is assumed that a HARQ feedback is transmitted via PUCCH format 2 in the disclosure, it is also possible that a HARQ feedback is transmitted via another PUCCH format.

In addition, in association with an encoding/decoding scheme of control information, an encoding/decoding scheme to be used and a length of a cyclic redundancy check (CRC) for error detection may be determined based on the amount of information (number of bits) transmitted via a PUCCH in the 5G system.

In addition, to transmit control information in an uplink, the UE may need to be aware of a PUCCH format and a parameter such as a time-frequency resource or the like.

A maximum of four PUCCH resource sets may be configured depending on the amount of uplink control information transmitted, and the range of feedback to be transmitted may be designated for each resource set. For example, PUCCH resource set 0 may transmit control information of a maximum of 2 bits.

In addition, in association with a PUCCH resource configuration, a single PUCCH resource set may include at least 4/a maximum of 8 PUCCH resource configurations. Each resource configuration may include a PUCCH format and various parameters needed for the format (time resource information including a start point and the number of OFDM symbols in which control information is to be transmitted in an uplink slot, frequency resource information including a location of resource block where control information transmission starts and the number of resource blocks, and the like).

Retransmission Protocol

Transmission via a wireless channel may have an error in case that the quality of a reception signal changes due to interference from an adjacent signal or a channel state between a transmission end and a reception end. In case that an error is not solved even though channel coding is applied, the reception end may request retransmission from the transmission end. In an NR, three protocol layers such as MAC, RLC. PDCP, and the like have retransmission functions.

First, hybrid automatic repeat request (HARQ) retransmission aims at significantly quick retransmission, and thus feedback indicating whether downlink transmission is successfully performed or fails to a base station for each transport block. In case that an ACK is received, a previous transmission is determined as successful transmission and a new transport block is transmitted. In case that a NACK is received, a previously transmitted transport block is retransmitted. In this instance, a base station and a UE share the maximum number of times of retransmission (maximum retransmission limit) for a transport block of which transmission has failed. In case that transmission fails although the transmission end attempts retransmission the maximum number of times, the transmission end finally determines that the transmission fails and flushes the corresponding transport block from a buffer.

Conversely, in case of HARQ retransmission, the maximum number of times of retransmission is limited, and thus an unrecoverable error may be present although retransmission is performed. In addition, although a transport block is received without an error, HARQ feedback itself may happen to have an error. As described above, an error rate provided even when a HARQ function is used is referred to as a residual error rate, and generally, the residual error rate is in a range of 0.1 to 1%. In most cases, such the error rate is considered sufficiently low. However, in order to support a TCP application or a service that requires a lower error rate such as an ultra-reliable low-latency communication (URLLC), a lower residual error rate may be required.

In order to solve the problem, a transmission end is enabled to perform retransmission in an RLC layer via an automatic repeat request (ARQ) retransmission process when data loss is detected, and thus a residual error rate may be decreased to be close to 0. ARQ retransmission less frequently occurs when compared to HARQ retransmission, and thus, a relatively smaller amount of resource may be consumed. Instead, a period of time spent in transferring feedback to the transmission end may be long, which is a drawback.

There may be a trade-off relationship between HARQ retransmission and ARQ retransmission. Specifically, as described above, each of HARQ retransmission and ARQ retransmission has an advantage and a disadvantage in association with a feedback transfer speed and feedback accuracy. This is a reason why a retransmission architecture is prepared in another layer and is used in a trade-off manner in the 5G NR system, currently. Comparing the two retransmission methods, it is listed as shown in Table 1 below.

TABLE 1

| | HARQ | ARQ |
|---|---|---|
| Layer | MAC | RLC |
| Residual error rate | $10^{-2}$~$10^{-3}$ | Error-free |
| Feedback speed | Fast | Slow |
| Feedback overhead | High | Low |

The more a wireless communication system has been evolved, the more the maximum transmission speed required by each system has been also increased (20 Gbps in case of the 5G NR system, and 100-1000 Gbps in case of in a 6G system). However, the performance of a downlink of a common UE that supports the current 5G NR system is in a level capable of supporting only a speed in a range of 2.55 to 7.35 Gbps, which is significantly lower than the above-mentioned speed. This is mainly due to a processing load for processing an RLC-related function of an L2 layer which is performed in a reception end. Numerically, a processing load used in RLC operation reaches up to 243% of a MAC/PDCP layer. Representative functions performed in the RLC layer may include deduplication of an RLC protocol data unit (PDU), RLC PDU segmentation, and ARQ retransmission. Detailed functions needed for performing each function of the RLC may be summarized as follows.

Header parsing: RLC header information parsing

Segment handler: RLC PDU segmentation and reassembly

Window update: State variable and timer management

Status build: RLC ACK/NACK generation

Loss detection handler: State variable update at packet loss event

Among the detailed functions, a function that occupies most (approximately 67% to 83%) of an RLC processing load is a window update function. The window update function is needed to manage a timer for detecting a data loss and a state variable, which is performed for ARQ retransmission. This means that a downlink transmission speed is limited due to a processing load performed for ARQ retransmission in the RLC layer. This is an insoluble problem even though a transmission end more utilizes time-frequency resources, and a problem of a processing load in a reception end needs to be solved.

Therefore, related functions (window update, Status build. Loss detection handler) performed for supporting ARQ retransmission in the RLC layer is considered as the leading cause of the above-described problem (a decrease in a yield rate due to an RLC processing load) of the conventional art. In order to solve the problem of the conventional art, the disclosure completely replaces an ARQ retransmission function of the RLC layer by using a HARQ retransmission function of a MAC layer, and dramatically reduces a processing load of the RLC layer. Through the above, it is expected to overcome the problem of a decrease in a yield rate of transmission in a ultra high-speed mobile communication system such as 5G NR or 6G. To this end, the disclosure provides a method, a device, and a system for replacing an ARQ retransmission function by utilizing HARQ feedback information having high reliability.

Specifically, a residual error rate is in a high level in which the reliability of HARQ feedback is incapable of sufficiently preventing a packet loss, and thus HARQ retransmission and RLC retransmission operate in a trade-off manner in the 5G NR system. Accordingly, as a high-reliability HARQ feedback transmission method, the disclosure provides a method of obtaining a residual error rate of a low level in which HARQ retransmission feedback is capable of replacing RLC retransmission feedback.

In addition, in case a target residual error rate of high-reliability HARQ feedback that the disclosure aims at is determined, a resource needed for achieving the corresponding target residual error rate may be determined based on a channel state of a transmission end and a reception end. The resource needed may differ according to the number of UEs supported by the system, a pattern of a downlink/uplink traffic, or the like, and thus, to operate a system with a limited amount of resource, the disclosure provides a method of adaptively allocating a HARQ feedback resource.

In addition, in case that a channel state of a transmission end and reception end is badly poor and a vast amount of resource for high-reliability HARQ feedback is needed, or in case that a required yield rate of a service used in a reception end is not high and a burden of an RLC processing load is not high, an existing system operation mode may be a better method to save time-frequency resources than the method of the disclosure. Therefore, the disclosure provides a method of selecting an operation mode so that a transmission end or a reception end is capable of operating in a mode only according to the disclosure and is also capable of operating in the existing method.

In addition, the final objective of the disclosure is to replace an RLC ARQ retransmission function by using high-reliability HARQ feedback, thereby reducing a processing load of the RLC layer. To this end, the disclosure defines a function, a signaling procedure, a structure, or the like that needs to be defined in the MAC/RLC layer.

Figure 2:
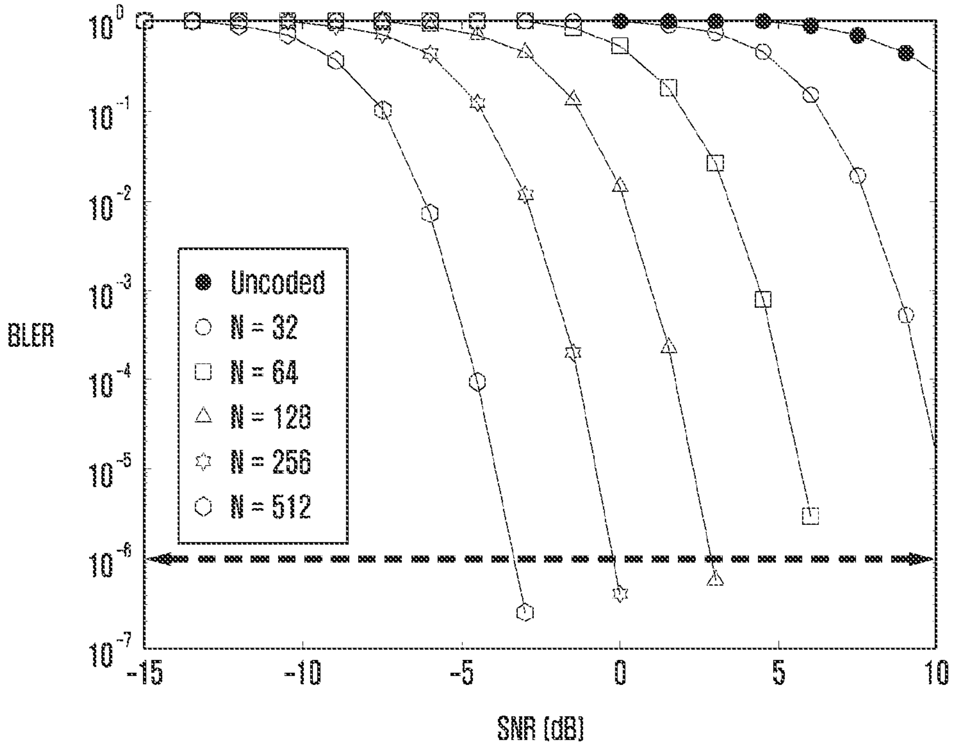
FIG. 2 is a diagram illustrating a block error rate (BLER) result according to an embodiment of the disclosure.

FIG. 2 is a diagram illustrating a block error rate (BLER) result according to an embodiment of the disclosure. Specifically, FIG. 2 illustrates examples of a block error rate (BLER) result that may be obtained when N coded bits are used to transmit the same amount of ACK/NACK feedback (19 bits) in a given channel state (signal-to-noise ratio).

In case that a transmission end transmits a transport block to a reception end, the reception end may determine whether the corresponding transport block is successfully transmitted and may transmit HARQ feedback. Factors that affect a residual error rate of HARQ feedback may be the amount of information transmitted (information bits for ACK/NACK feedbacks), the length of a CRC, the amount of parity bits for channel coding, the number of times of feedback transmission, a channel state of the transmission end and the reception end, and the like. The disclosure provides a method of decreasing a residual error rate by increasing the amount of parity bits used for HARQ feedback and the number of times of feedback transmission.

In case that a channel state of the transmission end and the reception end is given, a channel coding rate may be decreased by increasing the amount of parity bits of HARQ feedback according to the disclosure. In this manner, a residual error rate of HARQ feedback may be efficiently decreased when the same amount of ACK/NACK information is transmitted.

Referring to FIG. 2, it is recognized that the error rate of HARQ feedback may be reduced when the amount of parity bits is increased, and this may be acquired by additionally using an uplink PUCCH resource. The more a channel state (SNR) between the transmission end and the reception end is improved, the more the amount of uplink resources needed is decreased.

In addition, the conventional art assumes that HARQ feedback for a predetermined transport block is transmitted only once. However, in case that HARQ feedback for the same transport block is transmitted many times, a residual error rate of HARQ feedback may be efficiently decreased. Accordingly, provided is a method of controlling the number of times of feedback transmission (N_feedback) of a transmission end and a reception end.

Figure 3:
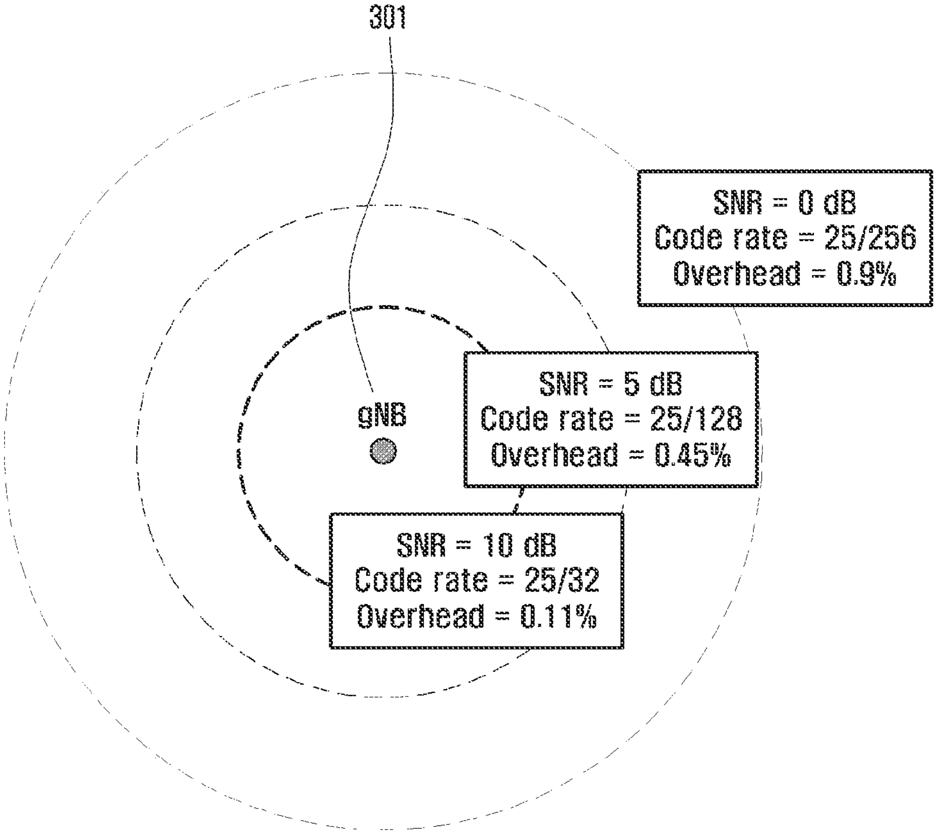
FIG. 3 is a diagram illustrating an example of allocating a resource adaptively to a channel state that varies depending on a distance between a base station and a user equipment (UE) according to an embodiment of the disclosure.

FIG. 3 is a diagram illustrating an example of allocating a resource adaptively to a channel state that varies depending on a distance between a base station and a UE according to an embodiment.

First, in case that a target residual error rate of HARQ feedback is determined, the amount of resource needed for HARQ feedback is determined based on a channel state of the transmission end and the reception end. In a mobile communication system, the channel state between the transmission end and the reception end may vary based on mobility or interference of an ambient signal, and thus a method of adaptively allocating a HARQ feedback resource is required.

The disclosure suggests a method of adaptively allocating an appropriate amount of resource by utilizing information (an SNR, an HARQ feedback error rate, or the like) usable for inferring the channel state between the transmission end and the reception end. FIG. 3 illustrates an example of allocating a resource adaptively based on a channel state that varies according to a distance between a base station 301 and a UE. In this instance, based on a channel state between the base station 301 and a UE and the amount of available uplink resource, the base station 301 may determine the location and the amount of resource to be allocated to a predetermined UE. In case that the amount of resource available at the present point in time is insufficient (e.g., in case that uplink data transmission occurs), it is effective to increase the number of times of feedback transmission since a small amount of feedback resource is used. Therefore, information associated with the number of times that HARQ feedback is to be repeated, in addition to a location and the amount of resource, may be transferred to the UE.

Feedback resource allocation information may be transferred via a downlink control information (DCI) field based on PUCCH resources set/resource configuration information, or may be transferred via an RRC configuration. Furthermore, feedback resource allocation information may be transferred by using a system information block (SIB). Specifically, the transferring method via DCI may be appropriate for quickly controlling the amount of feedback resource in a dynamic environment. In case that the amount of available resource is insufficient, the transferring method via RRC may be appropriate for reducing overhead provided during allocation of feedback resource although a resource allocation speed is not fast.

The feedback resource allocation information may include at least one among PUCCH power control, a PUCCH resource indicator (legacy feedback), a PUCCH resource indicator (repeated feedback), a feedback mode indicator, a repetition number ($N_{feedback}$), a repetition slot offset (Torr), and a repetition interval ($T_{interval}$).

In addition, to dynamically support various services (e.g., uplink streaming) in a mobile communication system, it may be better to allocate an uplink resource in uplink data transmission than to use high-reliability HARQ feedback by using a large amount of PUCCH resource. To handle such a variety of cases, the disclosure may support a function of turning on/off a mode suggested in the disclosure, and may also support selecting of an existing mode (simultaneous use of HARQ and ARQ retransmission). The base station 301 may transfer the information via a downlink control information (DCI) field based on PUCCH resources set/resource configuration information, or via an RRC configuration. Furthermore, feedback resource allocation information may be transferred by using a system information block (SIB).

In addition, in order to transfer the feedback resource allocation information, a single piece of uplink control information (UCI) or a plurality of pieces of UCI may be used. In case that a single piece of UCI is used, the UCI may include legacy feedback and repeated feedback. In addition, in case that a plurality of pieces of UCI is used, the pieces of UCI may separately include UCI for legacy feedback and UCI for repeated feedback.

Figure 4:
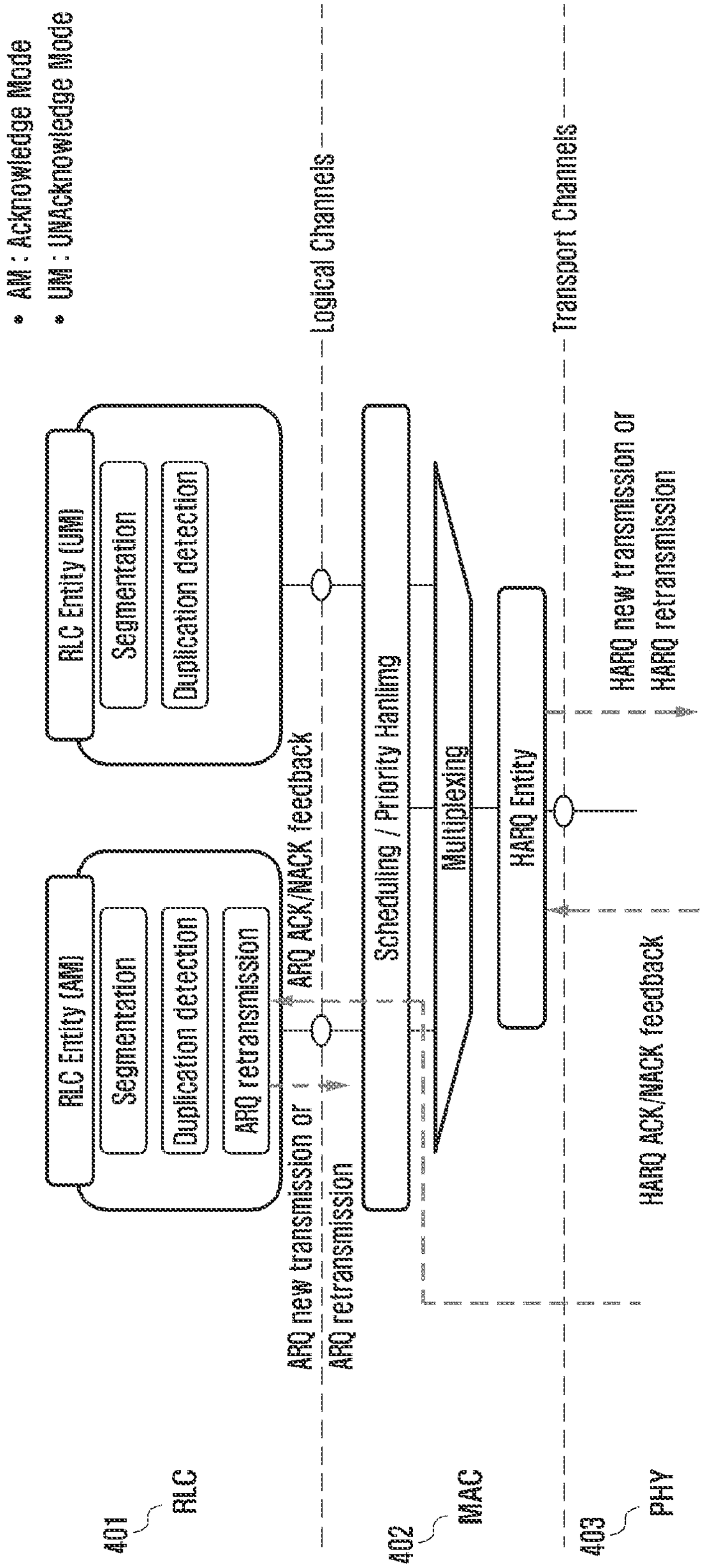
FIG. 4 is a diagram illustrating ARQ retransmission in an RLC layer based on a conventional HARQ retransmission function in an MAC layer.

FIG. 4 is a diagram illustrating ARQ retransmission in an RLC layer based on a conventional HARQ retransmission function in an MAC layer.

Conventionally, a MAC layer 402 performs a HARQ retransmission function and an RLC layer 401 performs an ARQ retransmission function, and thus each of the MAC layer 402 and the RLC layer 401 may include an independent retransmission function. Particularly, in the RLC layer 401, a processing load in the transmission end/reception end has been a problem due to functions performed to support retransmission via an ARQ retransmission function.

Figure 5:
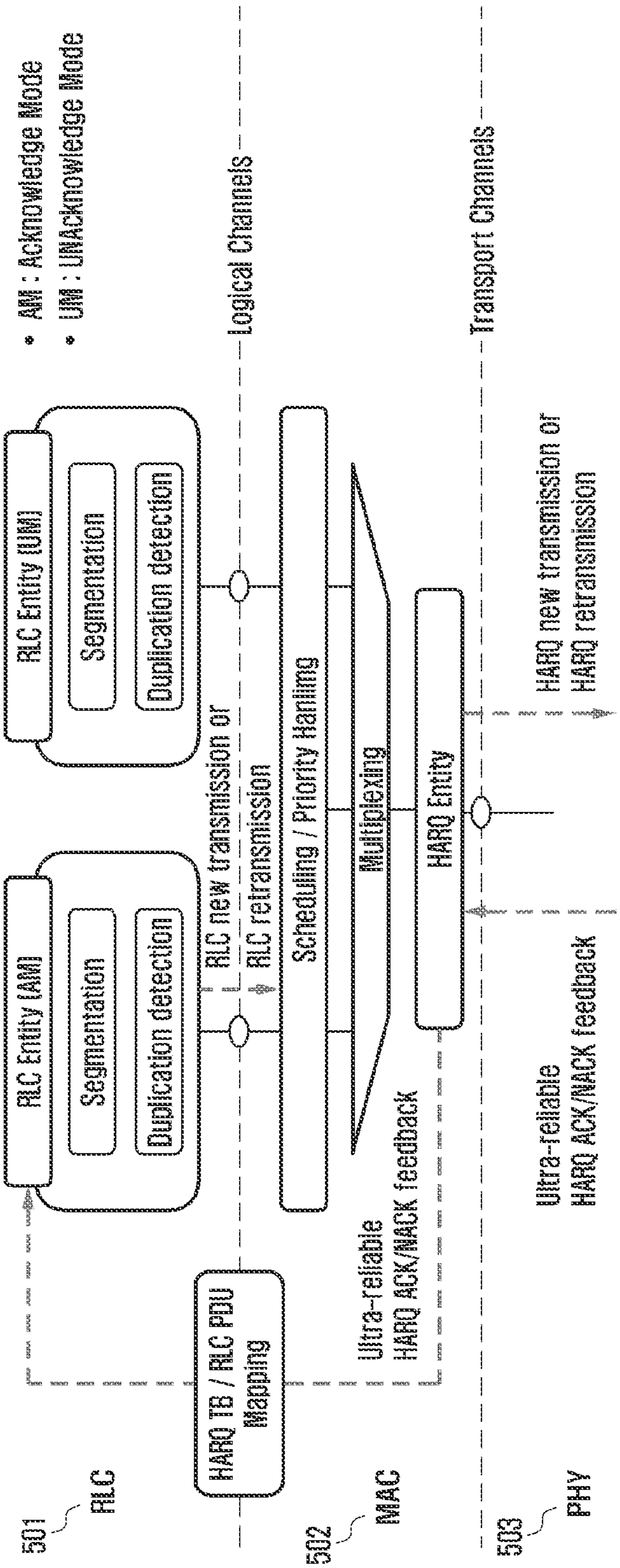
FIG. 5 is a diagram illustrating a method of retransmission in an RLC layer according to an embodiment of the disclosure.

FIG. 5 is a diagram illustrating a method of retransmission in an RLC layer according to an embodiment of the disclosure.

Specifically, FIG. 5 illustrates removing functions related to ARQ retransmission from an RLC layer 501 by replacing ACK/NACK of the RLC layer 501 used for ARQ retransmission with ACK/NACK feedback information of HARQ retransmission as illustrated in FIG. 4 FIG. 5 illustrates an example of a structure and a signaling process needed for each layer.

First, in case predetermined HARQ ACK/NACK information is received in the RLC layer 501, which RLC PDU is successfully transmitted or not needs to be aware of based on HARQ feedback (ACK/NACK) since a single transport block is multiplexed with multiple RLC PDUs and is transmitted. To this end, the method acquires a block to store mapping information between transmitted RLC PDUs and a transport block transmitted via HARQ. Via the block, in case that ACK information is received in the RLC layer 501, it is recognized that transmission of a corresponding RLC PDU is successfully performed in the RLC layer 501, and thus the corresponding RLC PDU may be removed from an RLC entity buffer. However, in case that a NACK is received, the corresponding RLC PDU is transmitted again in the MAC layer 502 and new HARQ transmission is performed. In this instance, RLC PDUs in an unacknowledged mode (UM) is data of which retransmission is not required, and thus the data may be transmitted to the MAC layer 502 and may be immediately removed from the RLC entity buffer, irrespective of HARQ feedback.

According to the method, a special function may not need to be performed for retransmission in the RLC layer 501, and thus an RLC processing load in the transmission end and the reception end may be significantly reduced, whereby a problem of a decrease in a yield rate of the conventional art may be overcome. However, although high-reliability HARQ feedback is used by using a large amount of uplink resource, a residual error rate is incapable of being 0, and thus an additional method to solve a problem when an error of high-reliability HARQ feedback occurs may be needed in order to completely replace the RLC ARQ retransmission function.

Figure 6A:
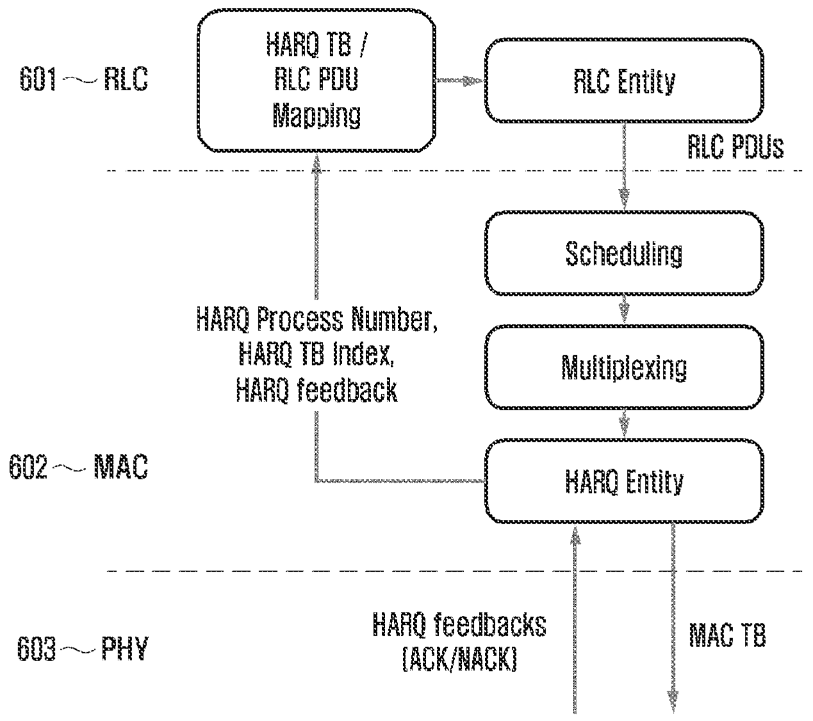
FIG. 6A is a diagram illustrating various structures according to an embodiment of the disclosure.
Figure 6B:
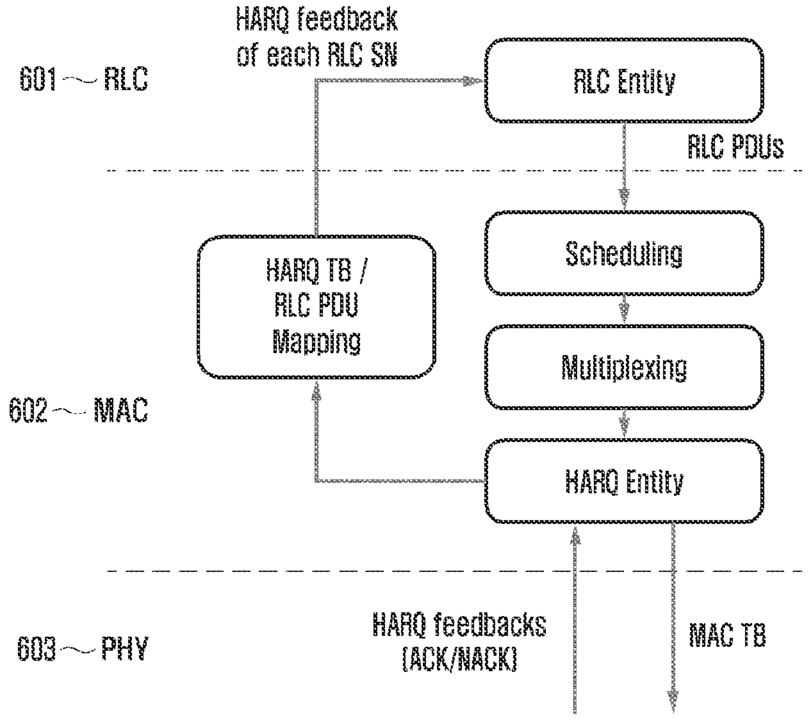
FIG. 6B is a diagram illustrating various structures according to an embodiment of the disclosure.
Figure 6C:
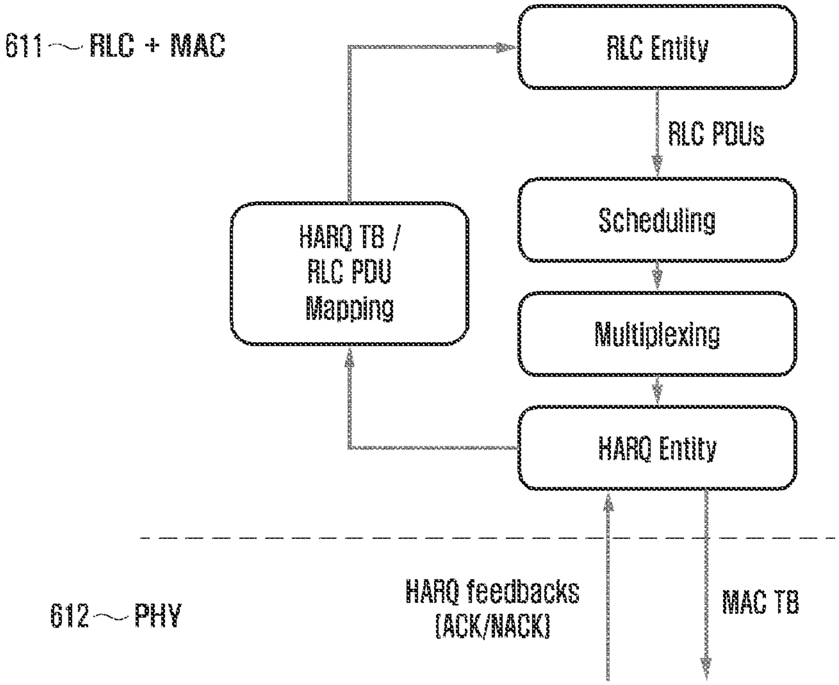
FIG. 6C is a diagram illustrating various structures according to an embodiment of the disclosure.

FIGS. 6A, 6B, and 6C are diagrams illustrating various structures according to an embodiment of the disclosure. Specifically, FIGS. 6A, 6B, and 6C are diagrams illustrating examples of a location of a block that stores mapping information of transmitted RLC PDUs and a transport block transmitted via HARQ.

FIG. 6A is the case in which a block that stores mapping information of transmitted RLC PDUs and a transport block transmitted via HARQ is present in an RLC layer 601. The block may include a HARQ process number, a HARQ transport block index, and HARQ feedback information.

FIG. 6B is the case in which a block that stores mapping information of transmitted RLC PDUs and a transport block transmitted via HARQ is present in a MAC layer 602. The block may include an RLC SN and HARQ feedback information.

FIG. 6C is the case in which a block that stores mapping information of transmitted RLC PDUs and a transport block transmitted via HARQ is present in a layer 611 that combines an RLC layer and an MAC layer.

In addition to the above-described structures, a block that stores mapping information of transmitted RLC PDUs and a transport block transmitted via HARQ may be present in various locations.

Figure 7:
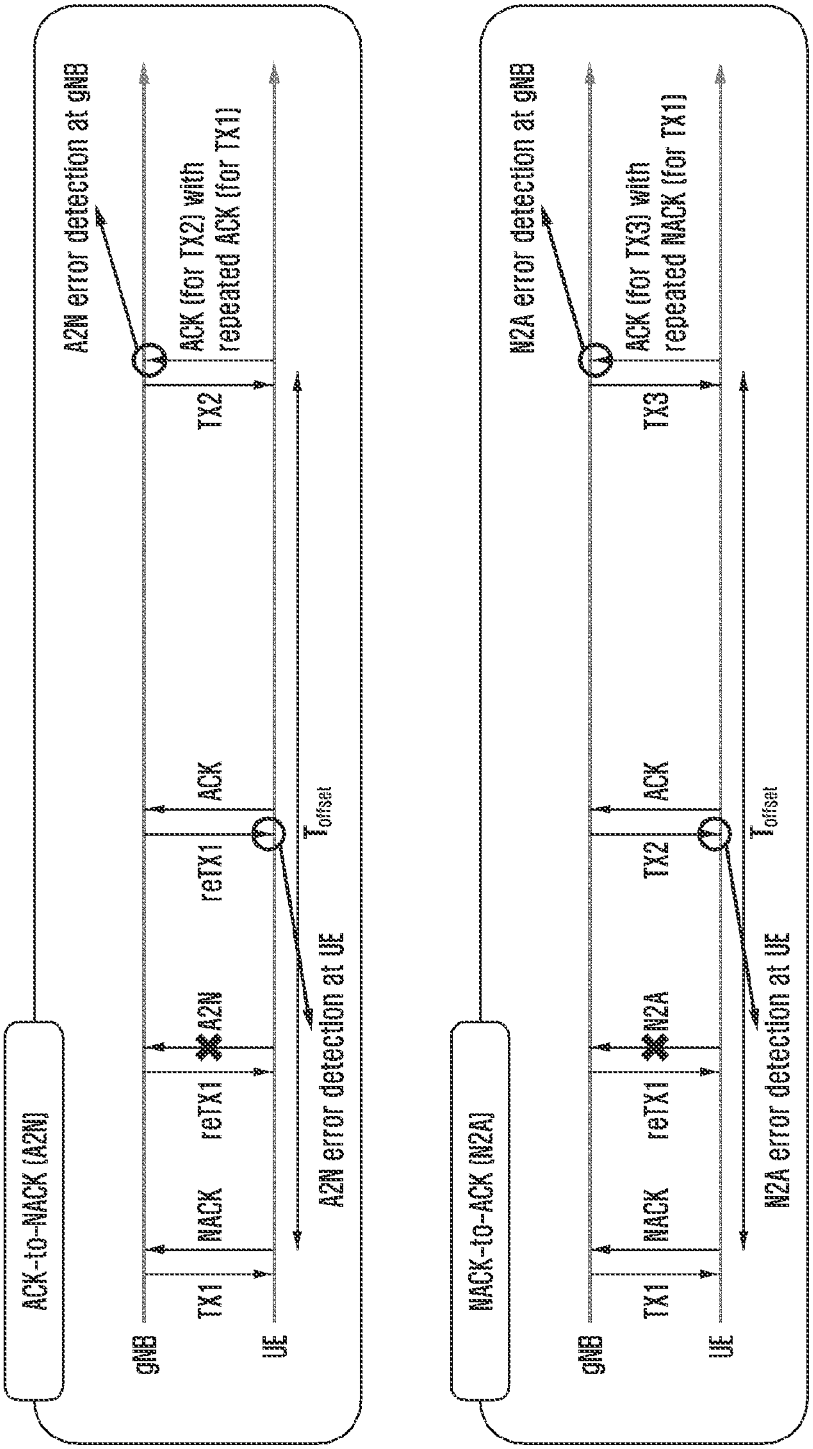
FIG. 7 is a diagram illustrating a method of overcoming a residual error by using high-reliability HARQ feedback provided in the disclosure.

FIG. 7 is a diagram illustrating a method of overcoming a residual error by using high-reliability HARQ feedback provided in the disclosure.

HARQ feedback errors rarely occurs in case that a high-reliability HARQ feedback suggested in the disclosure is used. Nevertheless, a residual error may occur with a low probability.

First, an ACK-to-NACK(A2N) error is the case in which a reception end successfully receives data and transmits an ACK but a transmission end determines the same as a NACK. For example, a base station transmits new data to a UE and receives a NACK. Accordingly, the base station performs retransmission according to a HARQ retransmission protocol, and the UE that successfully receives the retransmitted transport block transmits an ACK in an uplink. However, due to deterioration of a channel state, the base station decodes ACK feedback into a NACK, and thus unnecessary HARQ retransmission may be performed, which is a drawback.

In addition, a NACK-to-ACK(N2A) error is the opposite case of A2N, and is the case in which the reception end fails to receive data and transmits a NACK but the transmission end determines the same as an ACK. For example, the base station receives a NACK as feedback for initial transmission, and attempts HARQ retransmission. However, the retransmission also fails and the UE transmits a NACK, but the base station determines the same as an ACK. Accordingly, retransmission is not performed and, finally, corresponding data is lost which is a drawback. In order to remove a residual error rate as in the ARQ retransmission of the conventional art, both an A2N error and an N2A error need to be overcome. In case of an A2N error, successfully received data is received once again, whereas, in case of an N2A error, data is lost which is a worse drawback.

Accordingly, the disclosure provides a method of supporting repetitive transmission of high-reliability HARQ feedback (HARQ feedback repetition) in order to solve A2N and N2A problems. Specifically, upon reception of HARQ feedback transmitted from the reception end, the transmission end may not immediately determine whether it is an ACK/NACK, and may finally determine whether it is an ACK/NACK based on the HARQ feedback together with feedback repetitively received after a determined slot timing (e.g., $T_{offset}$). In this instance, it is assumed that the base station and the UE are aware of information ($N_{feedback}$) associated with the number of times of feedback repeated.

In case it is assumed that $N_{feedack}=1$, FIG. 7 illustrates an example of a method of overcoming an A2N error and an N2A error. Referring to FIG. 7, it is the case in which a base station performs retransmission after first transmission of TX1 fails, and an A2N error occurs when the base station receives HARQ feedback with respect to the retransmission. Therefore, the base station performs unnecessary retransmission, and, at this point in time, the UE may detect that an A2N error occurs in the base station. A predetermined slot $T_{offset}$ after the point in time of the initial transmission, feedback information associated with the existing transmission may be transmitted together with feedback associated with new transmission (TX2 of FIG. 7). The base station may finally determine whether it is an ACK/NACK by using both repeated feedback information and previously received feedback information. At this point in time, in case that the base station that has previously received feedback information as a NACK receives an ACK, the base station may detect that an A2N error has occurred. According to the method, via repetitive feedback transmission, the base station and the UE may be aware of whether an A2N error occurs, and may obtain an effect that decreases a residual error rate of HARQ feedback.

In addition, although the base station performs retransmission after receiving a NACK with respect to the initial transmission (TX1), the base station recognizes a NACK transmitted from the UE as an ACK, does not perform retransmission any longer, and starts new transmission (TX2). The UE may receive TX2 from the base station while awaiting retransmission of TX1, and at this point in time, may detect that an N2A error has occurred in the base station. A predetermined slot $T_{offset}$ after TX1, the base station may receive feedback for new transmission and feedback for previous transmission, simultaneously. At this point in time, the base station may recognize the fact that an N2A error has occurred, and may retransmit a corresponding RLC PDU so as to solve a data loss problem that may happen when an N2A error occurs.

According to the disclosure, the transmission end and the reception end may estimate a frequency of occurrence of a residual error of HARQ feedback. Based on the frequency of occurrence, whether the amount of parity bits allocated for HARQ feedback or the number of times of repetition is sufficient or insufficient to obtain a target HARQ residual error rate in a current channel state may be inferred. The information may be additionally utilized for a process in which the base station allocates a resource for high-reliability HARQ feedback, which is an advantage.

Figure 8:
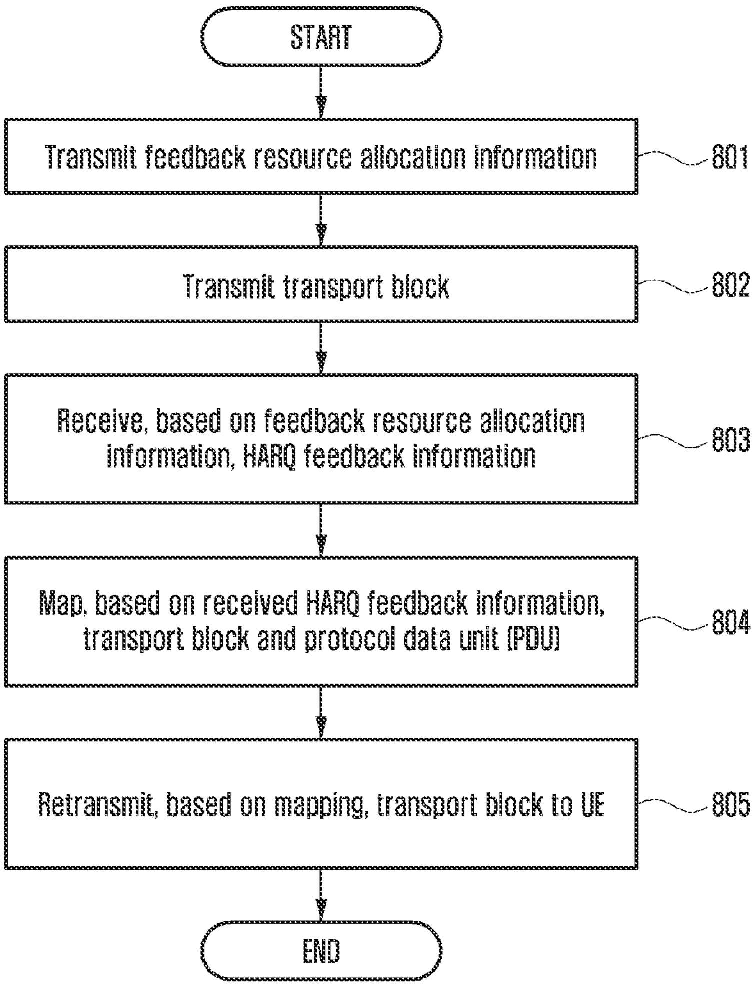
FIG. 8 is a diagram illustrating operation of a base station according to an embodiment of the disclosure.

FIG. 8 is a diagram illustrating operations of a base station according to an embodiment of the disclosure.

Referring to FIG. 8, a base station may transmit feedback resource allocation information to a UE in operation 801. Feedback resource allocation information may be transferred via a downlink control information (DCI) field based on PUCCH resources set/resource configuration information. In addition, the feedback resource allocation information may be transferred via an RRC configuration. Furthermore, feedback resource allocation information may be transferred by using a system information block (SIB). Specifically, the transferring method via DCI may be appropriate for quickly controlling the amount of feedback resource in a dynamic environment. In case that the amount of available resource is insufficient, the transferring method via RRC may be appropriate for reducing overhead provided during allocation of feedback resource although a resource allocation speed is not fast. The feedback resource allocation information may include at least one among PUCCH power control, a PUCCH resource indicator (legacy feedback), a PUCCH resource indicator (repeated feedback), a feedback mode indicator, a repetition number ($N_{feedback}$), a repetition slot offset ($T_{offset}$), and a repetition interval ($T_{interval}$). Subsequently, the base station may transmit a transport block to the UE in operation 802. The transport block may be transmitted via a downlink data transmission channel (PDSCH).

The base station may receive, from the UE, HARQ feedback information based on the feedback resource allocation information in operation 803. The HARQ feedback information may include information associated with whether transmission of the corresponding transport block is successfully performed/fails. The HARQ feedback information may be transmitted from the UE to the base station via an uplink control information transmission channel (PUCCH). Subsequently, a protocol data unit (PDU) and the transport block may be mapped based on the received HARQ feedback information in operation 804. The PDU mapped to the transmitted transport block may be an RLC PDU. Via the HARQ feedback information, mapping information of transmitted RLC PDUs and transmitted transport block may be stored. Based on the mapping information, the base station may retransmit the transport block to the UE in operation 805.

Figure 9:
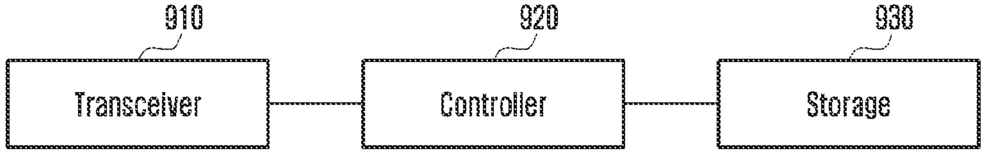
FIG. 9 is a diagram illustrating the structure of a base station according to an embodiment of the disclosure.

FIG. 9 is a diagram illustrating the structure of a base station according to an embodiment of the disclosure.

Referring to FIG. 9, a base station may include a transceiver 910, a controller 920, and a storage 930. In the disclosure, the controller may be defined as a circuit, an application-specified integrated circuit, or at least one processor.

The transceiver 910 may perform signal transmission or reception with another network entity. The transceiver 910 may transmit, for example, system information to a UE, and may transmit a synchronization signal or a reference signal.

The controller 920 may control the overall operation of the base station according to the embodiments of the disclosure. For example, the controller 920 may control a signal flow among blocks so that operations based on the above-described flowcharts are performed. Specifically, the controller 920 may control operation proposed in the disclosure in order to transmit a residual system information (RMSI) in a multi-beam based system according to an embodiment of the disclosure.

The storage 930 may store at least one piece of information among information transmitted or received via the transceiver 910 and information produced by the controller 920.

Figure 10:
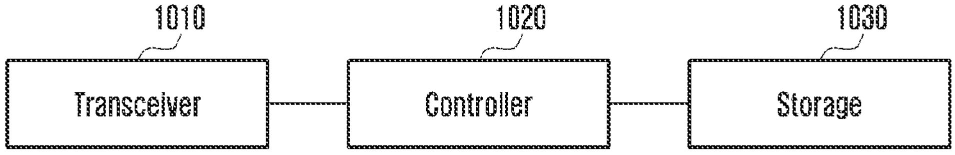
FIG. 10 is a diagram illustrating the structure of a user equipment (UE) according to an embodiment of the disclosure.

FIG. 10 is a diagram illustrating the structure of a UE according to an embodiment of the disclosure.

Referring to FIG. 10, a UE may include a transceiver 1010, a controller 1020, and a storage 1030. In the disclosure, the controller may be defined as a circuit, an application-specified integrated circuit, or at least one processor.

The transceiver 1010 may perform signal transmission or reception with another network entity. The transceiver 1010 may receive, for example, system information from a base station, and may receive a synchronization signal or a reference signal.

The controller 1020 may control overall operation of the UE according to the embodiments of the disclosure.

The invention claimed is:

1. A method performed by a base station, the method comprising:

transmitting, to a user equipment (UE), feedback resource allocation information;

transmitting, to the UE, a transport block;

receiving, from the UE, hybrid automatic repeat request (HARQ) feedback information for the transport block based on the feedback resource allocation information;

mapping the transport block and a protocol data unit (PDU) based on the HARQ feedback information, wherein a transmission status of each PDU in the transport block is determined based on the HARQ feedback information: storing information on the mapping;

retransmitting, to the UE, the transport block based on the information on the mapping;

receiving, from the UE, repeated HARQ feedback information based on the feedback resource allocation information; and determining whether to perform another retransmission of the transport block based on the repeated HARQ feedback information.

2. The method of claim 1, wherein the HARQ feedback information comprises a redundancy bit, and the redundancy bit occupies at least a predetermined ratio of the HARQ feedback information.

3. The method of claim 1, wherein the feedback resource allocation information comprises a plurality of uplink control information (UCI), wherein the plurality of UCI comprises first UCI and second UCI;

wherein the first UCI is related to the HARQ feedback information; and wherein the second UCI is related to the repeated HARQ feedback information.

4. The method of claim 1, further comprising identifying whether the base station is in an unacknowledged mode (UM), wherein, in case that the base station is in the UM, the repeated HARQ feedback information is not received.

5. A method performed by a user equipment (UE), the method comprising:

receiving, from a base station, feedback resource allocation information;

receiving, from the base station, a transport block;

allocating a feedback resource based on the feedback resource allocation information;

transmitting, to the base station, hybrid automatic repeat request (HARQ) feedback information for the transport block in the allocated resource;

receiving, from the base station, a retransmission of the transport block based on information on mapping based on the HARQ feedback information, wherein a transmission status of each PDU in the transport block is determined based on the HARQ feedback information; and transmitting, to the base station, repeated HARQ feedback information based on the feedback resource allocation information, wherein the information on mapping is obtained by mapping the transport block and a protocol data unit (PDU), and wherein whether to perform another retransmission, by the base station, the transport block is determined based on the repeated HARQ feedback information.

6. The method of claim 5, wherein the HARQ feedback information comprises a redundancy bit, and the redundancy bit occupies at least a predetermined ratio of the HARQ feedback information.

7. The method of claim 5, wherein the feedback resource allocation information comprises a plurality of uplink control information (UCI), wherein the plurality of UCI comprises first UCI and second UCI, wherein the first UCI is related to the HARQ feedback information, and wherein the second UCI is related to the repeated HARQ feedback information.

8. The method of claim 5, further comprising identifying whether the base station is in an unacknowledged mode (UM), wherein, in case that the base station is in the UM, the repeated HARQ feedback information is not transmitted.

9. A base station comprising:

a transceiver configured to transmit or receive at least one signal; and a controller coupled to the transceiver, wherein the controller is configured to:

transmit, to a user equipment (UE), feedback resource allocation information;

transmit, to the UE, a transport block;

receive, from the UE, hybrid automatic repeat request (HARQ) feedback information for the transport block based on the feedback resource allocation information, map the transport block and a protocol data unit (PDU) based on the HARQ feedback information wherein a transmission status of each PDU in the transport block is determined based on the HARQ feedback information, store information on the mapping, retransmit, to the UE, the transport block based on the information on the mapping, receive, from the UE, repeated HARQ feedback information based on the feedback resource allocation information, and determine whether to perform another retransmission of the transport block based on the repeated HARQ feedback information.

10. The base station of claim 9, wherein the HARQ feedback information comprises a redundancy bit, and the redundancy bit occupies at least a predetermined ratio of the HARQ feedback information.

11. The base station of claim 9, wherein the feedback resource allocation information comprises a plurality of uplink control information (UCI), wherein the plurality of UCI comprises first UCI and second UCI, wherein the first UCI is related to the HARQ feedback information, and wherein the second UCI is related to the repeated HARQ feedback information.

12. The base station of claim 9, wherein the controller is further configured to identify whether the base station is in an unacknowledged mode (UM), and wherein, in case that the base station is in the UM, the repeated HARQ feedback information is not received.

13. A user equipment (UE), comprising:

a transceiver configured to transmit or receive at least one signal; and a controller coupled to the transceiver, wherein the controller is configured to:

receive, from a base station, feedback resource allocation information;

receive, from the base station, a transport block;

allocate a feedback resource based on the feedback resource allocation information;

transmit, to the base station, hybrid automatic repeat request (HARQ) feedback information for the transport block in the allocated resource;

receive, from the base station, a retransmission of the transport block based on information on mapping based on the HARQ feedback information, wherein a transmission status of each PDU in the transport block is determined based on the HARQ feedback information; and transmit, to the base station, repeated HARQ feedback information based on the feedback resource allocation information, wherein the information on mapping is obtained by mapping the transport block and a protocol data unit (PDU), and wherein whether to perform another retransmission, by the base station, the transport block is determined based on the repeated HARQ feedback information.

14. The UE of claim 13, wherein the HARQ feedback information comprises a redundancy bit, and the redundancy bit occupies at least a predetermined ratio of the HARQ feedback information.

15. The UE of claim 13, wherein the feedback resource allocation information comprises a plurality of uplink control information (UCI), wherein the plurality of UCI comprises first UCI and second UCI, wherein the first UCI is related to the HARQ feedback information, wherein the second UCI is related to the repeated HARQ feedback information, wherein the controller is further configured to identify whether the base station is in an unacknowledged mode (UM), and wherein, in case that the base station is in the UM, the repeated HARQ feedback information is not transmitted.

* * * * *